United States Patent [19]

Schraut

[11] Patent Number: 5,419,422
[45] Date of Patent: May 30, 1995

[54] DRIVER PLATE FOR A CLUTCH PLATE OF A MOTOR VEHICLE FRICTION CLUTCH

[75] Inventor: Alfred Schraut, Waigolshausen, Germany

[73] Assignee: Fichtel & Sachs AG, Schweinfurt, Germany

[21] Appl. No.: 142,494

[22] Filed: Oct. 22, 1993

[30] Foreign Application Priority Data

Oct. 22, 1992 [DE] Germany .................. 42 35 587.7

[51] Int. Cl.⁶ ............................................. F16D 13/68
[52] U.S. Cl. ............................................. 192/107 R
[58] Field of Search ................................ 192/107 R

[56] References Cited

U.S. PATENT DOCUMENTS

| 4,260,047 | 4/1981 | Nels | 192/107 R X |
| 4,449,621 | 5/1984 | F'Geppert | 192/107 R X |
| 4,674,616 | 6/1987 | Mannino, Jr. | 192/107 R |
| 5,332,075 | 7/1994 | Quigley et al. | 192/107 R |

FOREIGN PATENT DOCUMENTS 3436583 10/1984 Germany .
61-266195 11/1986 Japan .
635041 3/1950 United Kingdom .
2165323 4/1986 United Kingdom .

Primary Examiner—Richard M. Lorence
Attorney, Agent, or Firm—Brumbaugh, Graves, Donohue & Raymond

[57] ABSTRACT

A driver plate for a torsion-suspended clutch plate of a motor vehicle friction clutch includes an annular disk-shaped lining support (1) composed of a plurality of segments (17), in the form of stamped sheet metal parts, and a reinforcement part (5), provided with windows (13) for receiving springs (15) of a torsion spring system of the clutch disk. The outer circumference of the reinforcement part forms a centering edge (21) to which the segments (17) are welded, resting against it with inner arc-shaped concave contact edges (19). The segments (17) can be produced with a comparatively small amount of stamping waste. The contact edge (19) of the segments (17) can have comparatively rough tolerances, if the openings (11) required for fastening of the friction linings are cut into the lining support (1) after the welding process.

6 Claims, 1 Drawing Sheet

DRIVER PLATE FOR A CLUTCH PLATE OF A MOTOR VEHICLE FRICTION CLUTCH

BACKGROUND OF THE INVENTION

1. Field of the Invention

The invention relates to a driver plate for a torsion-suspended clutch plate of a motor vehicle friction clutch as well as to a method for producing such a driver plate.

2. The Prior Art

Conventional clutch plates of motor vehicle friction clutches usually have a hub which is centered in relation to the axis of rotation of the clutch and which can be connected, fixed against relative rotation, to a gear input shaft. A driver plate is seated on the hub so as to be rotatable over a limited relative angle of rotation and to support the friction linings of the clutch disk. The driver plate is connected with the hub in a rotationally elastic manner via springs of a torsion spring system. Torsion vibration dampers which make possible such a torsion spring action are also known and comprise at least several disks arranged next to each other on the same axis, which disks receive the springs of the torsion spring system in windows that are aligned axially with respect to each other. In conventional structures of torsion vibration dampers, the springs are disposed at the one end in the windows of two outer disk parts, which are connected to form a unit, and at the other end on a central disk part disposed between the two outer disk parts and rotatable in relation to them. The driver plate in this case forms one of the two outer disk parts or the central disk part.

DE-A-3 436 583 (GB-A-2 165 323) discloses a driver plate for a torsion-suspended clutch disk which has a substantially annular disk-shaped lining support disposed around the axis of rotation for attachment of the friction lining and a substantially annular disk-shaped reinforcement part which is centered in relation to the axis of rotation and has a plurality of windows distributed in the circumferential direction to receive the springs of the torsion spring system. Radially outside of the area of the windows, the reinforcement part has a centering edge of circular shape against which the lining support rests with a radially inner edge that substantially conforms to the circular shape of the centering edge. The lining support is welded to the reinforcement part along this contact edge. Such a construction is advantageous because of the possibility of producing the lining support and the reinforcement part separately and of designing them in accordance with their respective requirements. Also, the operating properties of such a driver plate generally meet the requirements. On the other hand, in the driver plate known from DE-A-34 36 583, the lining support is a comparatively large, one-piece component which can be produced only with a comparatively large amount of waste, for example, from its radially inner area.

SUMMARY OF THE INVENTION

It is an object of the invention to provide a driver plate of the foregoing type which can be produced more simply and less expensively than before. It is a further object of the invention to provide a process for producing such a driver plate.

In attainment of these objects, the invention proceeds from a driver plate for a torsion-suspended clutch plate of a motor vehicle friction clutch, including:

- a lining support, substantially in the shape of an annular disk, disposed around the axis of rotation for supporting friction linings, and
- a reinforcement part, substantially in the shape of an annular disk, having a plurality of windows distributed in the circumferential direction to receive springs of a torsion spring system,
- wherein the reinforcement part has a circular centering edge outside the area of the windows, and the lining support has a radially inner edge which at least approximately conforms to the circular shape of the centering edge and with which it rests against the centering edge and along which it is welded to the reinforcement part. In accordance with the invention, the lining support is constructed of a plurality of segments formed as individual stamped sheet metal parts, each of which extends over only a portion of the centering edge in the circumferential direction and has a contact edge for centering the reinforcement part. The contact edges of the segments are concavely shaped in the form of an arc which at least approximately corresponds to the radius of the centering edge. The lining support segments, disposed one behind the other in the circumferential direction, are respectively welded individually to the reinforcement part in the area of the centering edge.

With such a driver plate, it is possible to produce the lining support with a minimum of stamping waste. Thus the segments of the driver plate of the invention can be produced with considerably less waste material, for example, from an appropriately wide sheet iron strip. Since it is possible to respectively center the individual segments at the centering edge of the reinforcement part by means of their concave inner contact edges, the manufacturing tolerances can be selected to be considerably wider, at least in the area of the inner contact edge, than with prior art driver plates. Because each segment rests against the centering edge only in a partial area of its total circumference, no extensive variations of a gap possibly remaining between these edges occurs, so that, notwithstanding the wider tolerances, no problems arise during subsequent welding.

The method in accordance with the invention for producing the invention driver plate includes the following steps:

a. stamping of segments of sheet metal which are separated from each other and can be combined into the lining support by lining them up against each other, wherein each segment has a contact edge which is concavely bent in the shape of an arc, corresponding at least approximately to the radius of the centering edge, for centering on the centering edge of the reinforcement part;

b. fixing the reinforcement parts and a number of segments required for combining into the lining support in an assembling jig in such a way that the arc-shaped contact edges rest against the centering edge; and c. welding the fixed segments along their contact edges to the reinforcement part in the area of the centering edge.

Use of the assembling jig in which the segments and the reinforcement part are fixed prior to welding assures that the variations of the gap remaining between the centering edge and the concave contact surfaces of the segments because of tolerances remain as small as possible. The possibly large rough tolerances of the inner contour of the segments which form the contact surfaces, therefore, scarcely have any effect on the quality of the driver plate.

The lining support is conventionally provided with openings, such as rivet holes or the like, for fastening the friction linings, or a lining spring system which supports the friction linings, to the lining support. These openings can already be stamped at the beginning during stamping of the segments. However, it has been proven to be very advantageous if at least the openings provided for fastening the friction linings are cut, for example, punched or drilled out, only after the welding process by which the segments are connected to the reinforcement part. In this way, it is assured that even with large tolerances in the area of the contact edges of the segment, these tolerances will have no effect on the exactly-centered fastening of the friction linings. It is understood that not only the openings used for fastening, but also further openings, such as those used for weight reduction for example, are also provided in the segments only after the welding process in order to prevent eccentricities. The above-described preferred embodiment of the manufacturing method makes it possible for the tolerances of the distance of the openings from the axis of rotation to be less than the tolerances with which the arc-shaped contact edge of each segment conforms to the radius of the centering edge of the reinforcement part. This is correspondingly true for openings provided for weight reduction.

Each segment is suitably bounded in the circumferential direction by edges which extend radially over at least a portion of the radial dimensions of the segment. The circumferential spacing between such edges, i.e. the circumferential width of each segment, is selected so that the segments forming the lining support are combined into an annular disk closed in the circumferential direction in order to make the cross section for transmitting the torque as large as possible. In a preferred embodiment, the segments are welded together along adjoining radial edges which in the circumferential direction substantially adjoin each other without gaps. In this way, the entire driver plate is provided with greater dimensional stability. The welded-together radial edges can extend over the total radial extent of the lining support but preferably extend, starting from the arc-shaped contact edge, only over a portion of the entire radial extent.

To make the stamped production of the segments easier, all segments forming the lining support preferably have the same exterior shape. In addition, the segments are suitably mirror-symmetrical in the circumferential direction in order to prevent mistakes in assembly.

BRIEF DESCRIPTION OF THE DRAWINGS

For a better understanding of the invention, reference may be made to the following description of an exemplary embodiment thereof, taken in conjunction with the accompanying drawings, in which.

DETAILED DESCRIPTION

Figure 1:
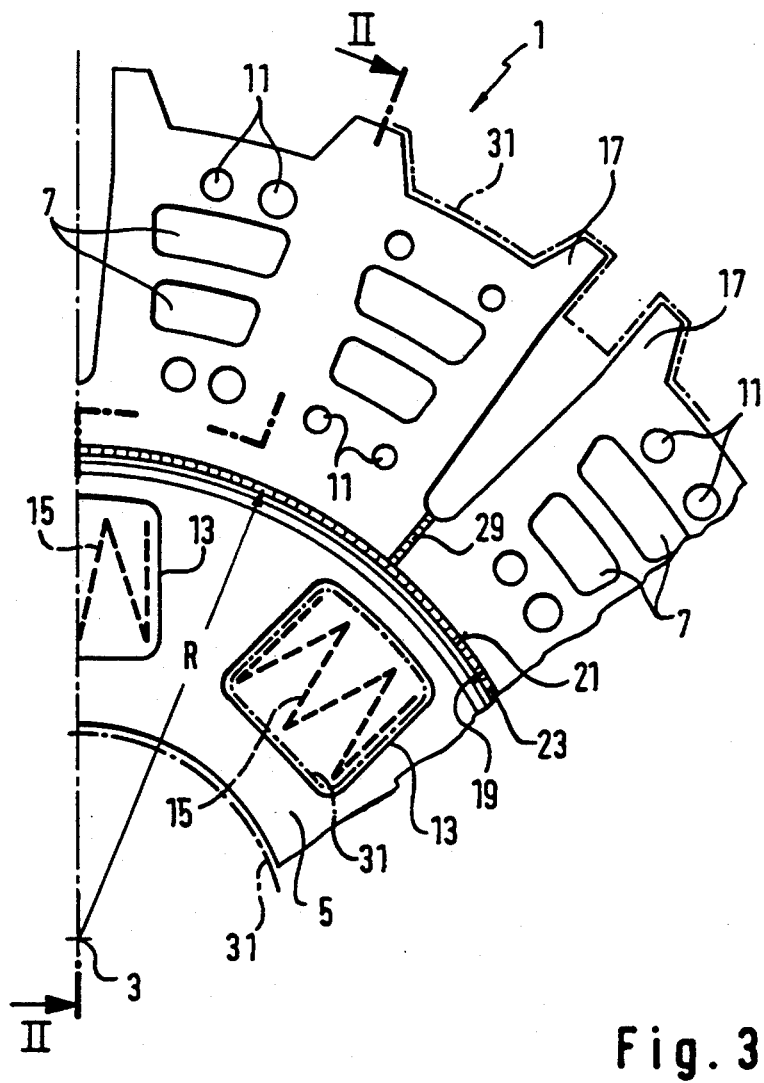
FIG. 1 is a partial view of a driver plate for a torsion-suspended clutch plate of a motor vehicle friction clutch.
Figure 2:
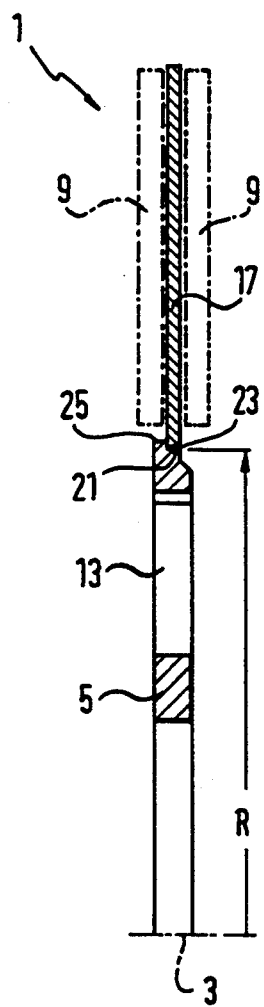
FIG. 2 is a sectional view of the driver plate viewed along the line II—II in FIG. 1.

The driver plate shown in partial view in FIGS. 1 and 2 is a part of a torsion-suspended clutch plate of a motor vehicle friction clutch, which clutch incidentally can be constructed in the conventional manner. The driver plate comprises an annular disk-shaped lining support, generally indicated by 1, which surrounds in a stationary manner an annular disk-shaped reinforcement part 5 which is centered in relation to an axis of rotation 3. Annular disk-shaped friction linings (indicated schematically at 9 in FIG. 2) are fastened, for example, by rivets, either directly or via a lining spring system not shown in detail, on both sides of the lining support 1. Appropriate holes or openings of the lining support 1 used for fastening the friction linings 9 can be seen at 11 in FIG. 1. Additional openings 7 may be provided in the lining support 1 for weight reduction. The reinforcement part 5 contains a plurality of windows 13 distributed in the circumferential direction for receiving springs, indicated at 15, of a torsion vibration damper (not shown in detail) of the clutch disk which causes the torsion spring action.

Figure 3:
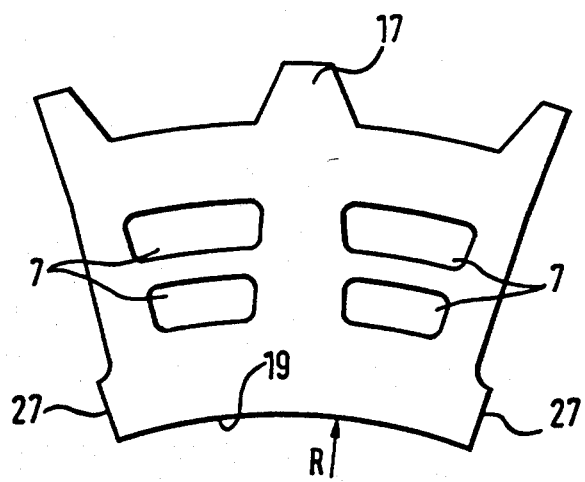
FIG. 3 is a lateral view of a segment of the lining support prior to assembly.

The lining support 1 is composed of a plurality of segments 17, which are disposed adjacent to each other in the circumferential direction and are respectively formed as individual stamped sheet metal parts. As best shown in FIG. 3, which represents the state of the segment 17 prior to assembly, each segment 17 has a concavely shaped contact edge 19 in the form of an arc with which it rests against a centering edge 21 which is centered in relation to the axis of rotation 3 and which is provided on the outer circumference of the reinforcement part 5. In the area of the centering edge 21, the segments 17 are welded along the contact edge 19 to the reinforcement part 5 with a weld bead 23 which is concentric with the axis of rotation 3. As shown in FIGS. 1 and 2, the centering edge 21 surrounds the area of the windows 13 radially on the outside. It only extends, as shown in FIG. 2, over a portion of the axial thickness of the reinforcement part 5 and makes a transition into a short annular flange 25 projecting radially outwardly, which makes the axial positioning of the segments 17 in relation to the reinforcement part 5 easier in a manner still to be described below, but which can be omitted, if required.

As best shown in FIG. 3, the segments 17 are stamped sheet metal parts which are mirror-symmetrical in the circumferential direction and can therefore be 10 installed with arbitrarily selectable orientation. Each segment has radial edges 27 immediately adjoining the arc-shaped contact edge 19, which edges 27 in the present exemplary embodiment extend over only a portion of the radial dimensions of the segment 17. The exterior contours of the segments 17 combined into the lining support 1 are all the same, and the distance between the two radial edges 27 of each segment 17 is selected such that adjoining radial edges 27 of adjoining segments 17 abut against each other substantially free of play when the segments rest against the centering edge 21 with their contact edges 19. As shown in FIG. 1, the adjoining radial edges are connected with each other via radial weld beads 29, which increases the mechanical strength of the driver plate.

In the course of production of the driver plate, the segments are first stamped in accordance with the configuration of FIG. 3, i.e., without the holes 11 (see FIG. 1) intended for fastening the friction linings 9, out of a strip of sheet metal or the like, which can be done with comparatively little stamping waste. The requirements for accuracy of shape of the contact edge 19 can be relatively loose. Then the reinforcement part 5 and the number of segments 17 that make up the annular shape of the lining support 1 are together inserted into an assembly jig or assembly mold, which is indicated in dash-dotted lines at 31. The assembly jig 31 fixes the segments 17 resting axially against the flange 25 of the reinforcement part 5 with the contact edges 19 simultaneously resting against the centering edge 21. The segments 17 are then welded in the fixed state to the reinforcement part 5, and the weld beads 23, 29 are formed. Following the welding operation, the openings 11 required for fastening the friction linings 9 to the lining support 1 are cut, for example, by punching or drilling. Although the contact edges 19 of the segments 17 and the centering edge 21 of the reinforcement part 5 have substantially the same radius R, deviations from the radii based on tolerances cannot be ruled out. Because the openings 11 are only cut into the lining support 1 after the welding process, it is possible by simple means to keep the tolerances of the radial distance of the openings 11 from the axis of rotation 3 smaller than the tolerance deviations between the contact edge 19 and the radial distance R determined by the centering edge 21. Because of the rougher tolerances in the area of the contact edge 19, it is possible to compensate for small radial positional variations of the individual segments 17 if, as explained, the openings 11 are cut later. It is understood that the openings 7, shown in FIGS. 1 and 3, and used for weight savings, can also be cut after the welding process, which reduces the eccentricity of the driver plate. To the extent that a balancing step is required, it is also performed in an advantageous manner following the welding process.

The flange 25 shown in FIG. 2 and used as an axial stop may, as already mentioned, be omitted because the segments 17 and the reinforcement part 5 may, if desired, also be axially aligned with respect to each other in the assembly jig 31 and fixed for the welding process. If desired, the radial edges 27 and, correspondingly, the radial weld beads 29, provided for increasing the stability of the driver plate, can also extend, starting from the contact edge 19, over the entire radial extent of the segments 17.

I claim:

1. A driver plate for a torsionally elastic clutch plate of a motor vehicle friction clutch, the clutch plate including a substantially annular disk-shaped lining support disposed around an axis of rotation for supporting friction linings and a substantially annular disk-shaped reinforcement part which is centered in relation to the axis of rotation and has a plurality of windows distributed in the circumferential direction to receive springs of a torsion spring system, the reinforcement part having a centering edge of circular shape radially outside of the area of the windows, and the lining support having a radially inner edge which substantially conforms to the circular shape of the centering edge and along which it is welded to the reinforcement part, wherein:

the lining support comprises a plurality of segments formed as individual stamped sheet metal parts, each of which parts extends along only a portion of the centering edge in the circumferential direction;

each segment has a contact edge engaging the centering edge of the reinforcement part, the contact edge being concavely shaped in the form of an arc and at least approximately conforms to the radius (R) of the centering edge; and the segments are disposed adjacent to each other in the circumferential direction, each segment having the contact edge individually in contact with the centering edge of the reinforcement part and being individually welded to the reinforcement part in the area of the centering edge.

2. A driver plate in accordance with claim 1, wherein each segment is bounded in the circumferential direction by edges extending radially over at least a portion of the radial dimensions of the segments, the circumferential distance between said radially extending edges being such that the segments forming the lining support together form an annular disk that is substantially closed in the circumferential direction, and adjoining segments are welded together along adjoining radial edges.

3. A driver plate in accordance with claim 2, wherein the radially extending edges of each segment essentially follow the arc-shaped contact edge directly.

4. A driver plate in accordance with one of claims 1 to 3, wherein all segments which form the lining support have the same exterior contours.

5. A driver plate in accordance with one of claims 1 to 3, wherein each segment is mirror-symmetrical in the circumferential direction.

6. A driver plate in accordance with one of claims 1 to 3, wherein the segments have openings for the attachment thereto of friction linings, and the tolerances of the distance of the openings from the axis of rotation is less than the tolerance with which the arc-shaped contact edge of each segment conforms to the radius (R) of the centering edge of the reinforcement part.

* * * * *